United States Patent
Godlewski

(10) Patent No.: US 8,170,927 B2
(45) Date of Patent: May 1, 2012

(54) ADAPTIVE CRITICAL LOW LEVEL MANAGEMENT

(75) Inventor: Peter Phillip Godlewski, San Clemente, CA (US)

(73) Assignee: Carefusion 303, Inc., San Diego, CA (US)

( * ) Notice: Subject to any disclaimer, the term of this patent is extended or adjusted under 35 U.S.C. 154(b) by 20 days.

(21) Appl. No.: 12/242,652

(22) Filed: Sep. 30, 2008

(65) Prior Publication Data

US 2010/0082458 A1 Apr. 1, 2010

(51) Int. Cl.
*G06Q 10/00* (2006.01)

(52) U.S. Cl. ............ 705/28; 705/26; 700/216; 700/236; 700/244

(58) Field of Classification Search .................. None
See application file for complete search history.

(56) References Cited

U.S. PATENT DOCUMENTS

| | | | | |
|---|---|---|---|---|
| 4,737,910 A | * | 4/1988 | Kimbrow | 705/28 |
| 5,594,529 A | * | 1/1997 | Yamashita et al. | 399/8 |
| 5,608,621 A | * | 3/1997 | Caveney et al. | 705/10 |
| 7,668,761 B2 | * | 2/2010 | Jenkins et al. | 705/28 |
| 2004/0068344 A1 | * | 4/2004 | Tsuji | 700/214 |
| 2006/0085291 A1 | * | 4/2006 | Yoshida et al. | 705/28 |
| 2006/0085299 A1 | * | 4/2006 | Goll et al. | 705/28 |

* cited by examiner

*Primary Examiner* — Luna Champagne

(74) *Attorney, Agent, or Firm* — McDermott Will & Emery LLP

(57) ABSTRACT

An adaptive critical low level management system is described. In some embodiments, the system includes a configuration module configured to receive a service level setting and a storage module configured to receive usage information for at least one inventory of at least one type of medical item. The system also includes a processor configured to adaptively determine a critical low level based on the usage information and the service level setting, and an analysis module configured to determine when the critical low level has been reached by the at least one inventory of the at least one type of medical item, and to produce an output indication that the critical low level has been reached.

16 Claims, 7 Drawing Sheets

| Day | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Usage | | 2 | 3 | 1 | 1 | 1 | 0 | 1 | 1 | 1 | 1 | 1 | 1 | 1 | 1 | 1 | 0 | 2 |
| Restock | | | | 6 | 0 | 0 | 0 | 3 | 0 | 0 | 0 | 4 | 0 | 0 | 0 | 4 | 0 |
| CL restock | | | | 6 | 0 | 0 | 0 | 3 | 0 | 0 | 0 | 4 | 0 | 0 | 0 | 4 | 0 |
| Restock value | | | | 6 | 0 | 0 | 0 | 3 | 0 | 0 | 0 | 4 | 0 | 0 | 0 | 4 | 0 |
| Item level at end of day | 10 | 8 | 5 | 4 | 9 | 8 | 7 | 7 | 9 | 8 | 7 | 6 | 9 | 8 | 7 | 6 | 10 | 8 |
| Item Max | 10 | 10 | 10 | 10 | 10 | 10 | 10 | 10 | 10 | 10 | 10 | 10 | 10 | 10 | 10 | 10 | 10 | 10 |
| Item Min | 6 | 6 | 6 | 6 | 6 | 6 | 6 | 6 | 6 | 6 | 6 | 6 | 6 | 6 | 6 | 6 | 6 | 6 |
| Critical Low Level at beginning of day | 0 | 0 | 4 | 4 | 12 | 7 | 6 | 3 | 9 | 7 | 5 | 3 | 7 | 6 | 5 | 2 | 7 | 5 |
| Item Restock Date | | | | 1 | | | | 1 | 0 | 0 | 0 | 1 | 0 | 0 | 0 | 1 | 0 |
| Critical Low Restock | | 0 | 0 | 0 | 1 | 0 | 0 | 0 | 1 | 0 | 0 | 0 | 1 | 0 | 0 | 0 | 1 | 0 |
| Days Before Next Order | | 4 | 3 | 2 | 1 | 4 | 3 | 2 | 1 | 4 | 3 | 2 | 1 | 4 | 3 | 2 | 1 | 4 | 3 |
| Restock on Schedule | 0 | 0 | 0 | 0 | 1 | 0 | 0 | 0 | 1 | 0 | 0 | 0 | 1 | 0 | 0 | 0 | 1 | 0 |
| Perceived Daily Usage | | 2 | 3 | 1 | 1 | 1 | 1 | 0 | 1 | 1 | 1 | 1 | 1 | 1 | 1 | 1 | 0 | 2 |
| Avg. Usage - 1 day | | 2.00 | 2.50 | 2.00 | 1.75 | 1.60 | 1.50 | 1.29 | 1.25 | 1.22 | 1.20 | 1.18 | 1.17 | 1.15 | 1.14 | 1.13 | 1.06 | 1.12 |
| Deviation Usage 1 day | | 0.00 | 0.71 | 1.00 | 0.96 | 0.89 | 0.84 | 0.95 | 0.89 | 0.83 | 0.79 | 0.75 | 0.72 | 0.69 | 0.66 | 0.64 | 0.68 | 0.70 |
| 2 day rolling utilization | | | 5 | 4 | 2 | 2 | 2 | 1 | 1 | 2 | 2 | 2 | 2 | 2 | 2 | 2 | 1 | 2 |
| Avg. Usage 2 day | | | 5.00 | 4.50 | 3.67 | 3.25 | 3.00 | 2.67 | 2.43 | 2.38 | 2.33 | 2.30 | 2.27 | 2.25 | 2.23 | 2.21 | 2.13 | 2.13 |
| Deviation Usage 2 day | | | 0.00 | 0.71 | 1.53 | 1.50 | 1.41 | 1.51 | 1.51 | 1.41 | 1.32 | 1.25 | 1.19 | 1.14 | 1.09 | 1.05 | 1.06 | 1.02 |
| 3 day rolling utilization | | | | 6 | 5 | 3 | 3 | 2 | 2 | 2 | 3 | 3 | 3 | 3 | 3 | 3 | 2 | 3 |
| Avg. Usage 3 day | | | | 6.00 | 5.50 | 4.67 | 4.25 | 3.80 | 3.50 | 3.29 | 3.25 | 3.22 | 3.20 | 3.18 | 3.17 | 3.15 | 3.07 | 3.07 |
| Deviation Usage 3 day | | | | 0.00 | 0.71 | 1.53 | 1.50 | 1.64 | 1.64 | 1.60 | 1.49 | 1.39 | 1.32 | 1.25 | 1.19 | 1.14 | 1.14 | 1.10 |
| 4 day rolling utilization | | | | | 7 | 6 | 4 | 3 | 3 | 3 | 3 | 4 | 4 | 4 | 4 | 4 | 3 | 4 |
| Avg. Usage 4 day | | | | | 7.00 | 6.50 | 5.67 | 5.00 | 4.60 | 4.33 | 4.14 | 4.13 | 4.11 | 4.10 | 4.09 | 4.08 | 4.00 | 4.00 |
| Deviation Usage 4 day | | | | | 0.00 | 0.71 | 1.53 | 1.83 | 1.82 | 1.75 | 1.68 | 1.55 | 1.45 | 1.37 | 1.30 | 1.24 | 1.22 | 1.18 |
| Estimated Usage Before next restock | 0 | 0 | 4 | 4 | 12 | 7 | 6 | 3 | 9 | 7 | 5 | 3 | 7 | 6 | 5 | 2 | 7 | 5 |

CL = Critical Level

*FIG. 4*

| | | | | | | | | | | | | | | | |
|---|---|---|---|---|---|---|---|---|---|---|---|---|---|---|---|
| Estimated Usage Before next restock | 4 | 2 | 6 | 6 | 5 | 3 | 9 | 7 | 5 | 3 | 8 | 7 | 5 | • • • | 7.6 |
| Deviation Usage 4 day | 1.13 | 1.12 | 1.45 | 1.79 | 1.91 | 1.88 | 1.84 | 1.84 | 1.79 | 1.76 | 1.74 | 1.72 | 1.70 | • • • | 1.9 |
| Avg. Usage 4 day | 4.00 | 4.06 | 4.29 | 4.56 | 4.74 | 4.80 | 4.76 | 4.68 | 4.70 | 4.71 | 4.76 | 4.81 | 4.85 | • • • | 5.8 |
| 4 day rolling utilization | 4 | 5 | 8 | 9 | 8 | 6 | 4 | 3 | 5 | 5 | 6 | 6 | 6 | • • • | 8.0 |
| Deviation Usage 3 day | 1.06 | 1.13 | 1.28 | 1.64 | 1.69 | 1.65 | 1.71 | 1.68 | 1.76 | 1.63 | 1.60 | 1.57 | 1.61 | • • • | 1.6 |
| Avg. Usage 3 day | 3.06 | 3.18 | 3.33 | 3.58 | 3.70 | 3.67 | 3.55 | 3.52 | 3.58 | 3.60 | 3.62 | 3.63 | 3.71 | • • • | 4.3 |
| 3 day rolling utilization | 3 | 5 | 6 | 8 | 6 | 3 | 1 | 3 | 5 | 4 | 4 | 4 | 6 | • • • | 5.0 |
| Deviation Usage 2 day | 1.10 | 1.00 | 1.16 | 1.39 | 1.36 | 1.44 | 1.44 | 1.41 | 1.42 | 1.39 | 1.37 | 1.37 | 1.38 | • • • | 1.3 |
| Avg. Usage 2 day | 2.18 | 2.22 | 2.37 | 2.55 | 2.57 | 2.45 | 2.39 | 2.42 | 2.48 | 2.46 | 2.44 | 2.50 | 2.55 | • • • | 2.9 |
| 2 day rolling utilization | 3 | 3 | 5 | 6 | 3 | 0 | 1 | 3 | 4 | 2 | 2 | 4 | 4 | • • • | 3.0 |
| Deviation Usage 1 day | 0.68 | 0.69 | 0.79 | 0.86 | 0.88 | 0.90 | 0.88 | 0.88 | 0.87 | 0.89 | 0.89 | 0.88 | 0.88 | • • • | 0.8 |
| Avg. Usage - 1 day | 1.11 | 1.16 | 1.25 | 1.33 | 1.27 | 1.22 | 1.21 | 1.24 | 1.27 | 1.22 | 1.25 | 1.28 | 1.30 | • • • | 1.5 |
| Perceived Daily Usage | 1 | 2 | 3 | 3 | 0 | 0 | 1 | 2 | 2 | 0 | 2 | 2 | 2 | • • • | 1.0 |
| Restock on Schedule | 0 | 0 | 1 | 0 | 0 | 0 | 0 | 0 | 0 | 1 | 0 | 0 | • • • | 0.0 |
| Days Before Next Order | 2 | 1 | 4 | 3 | 2 | 1 | 4 | 3 | 2 | 1 | 4 | 3 | 2 | • • • | 3.0 |
| Critical Low Restock | 0 | 0 | 1 | 0 | 1 | 0 | 0 | 0 | 0 | 1 | 0 | 0 | • • • | 0.0 |
| Item Restock Date | 0 | 0 | 1 | 0 | 0 | 0 | 1 | 0 | 0 | 0 | 1 | 0 | 0 | • • • | 0.0 |
| Critical Low Level at beginning of day | 4 | 2 | 6 | 6 | 5 | 3 | 9 | 7 | 5 | 3 | 8 | 7 | 5 | • • • | 8.0 |
| Item Min | 6 | 6 | 6 | 6 | 6 | 6 | 6 | 6 | 6 | 6 | 6 | 6 | 6 | • • • | 6.0 |
| Item Max | 10 | 10 | 10 | 10 | 10 | 10 | 10 | 10 | 10 | 10 | 10 | 10 | 10 | • • • | 10.0 |
| Item level at end of day | 7 | 5 | 7 | 4 | 10 | 10 | 9 | 7 | 5 | 5 | 8 | 6 | 4 | • • • | 7.0 |
| Restock value | 0 | 0 | 5 | 0 | 6 | 0 | 0 | 0 | 0 | 5 | 0 | 0 | • • • | 0.0 |
| CL restock | 0 | 0 | 5 | 0 | 6 | 0 | 0 | 0 | 0 | 5 | 0 | 0 | • • • | 0.0 |
| Restock | 0 | 0 | 5 | 0 | 0 | 0 | 0 | 0 | 0 | 5 | 0 | 0 | • • • | 0.0 |
| Usage | 1 | 2 | 3 | 3 | 0 | 0 | 1 | 2 | 2 | 0 | 2 | 2 | 2 | • • • | 1.0 |
| Day | 18 | 19 | 20 | 21 | 22 | 23 | 24 | 25 | 26 | 27 | 28 | 29 | 30 | • • • | 45 |

CL = Critical Level

*FIG. 4 Cont.*

| Critical Low (CL) Calculation | |
|---|---|
| Service Level in Standard Deviation | 2 |
| Summary Usage for 45 days | 69 |
| Weekly usage | 11.50 |
| Average Daily usage | 1.53 |
| Days between restocks | 4 |
| Recommended Min | 7 |
| Number of scheduled restocks | 10 |
| Number of total restocks | 11 |
| Number of unscheduled restocks | 1 |
| Number of stockouts | 0 |

*FIG. 5*

| Critical Low (CL) Performance - Auto vs. Manual | | |
|---|---|---|
| | Unscheduled Restock | Service Level |
| Automated CL with 2 sigma | 2.6 | 99.78% |
| CL set at 10% par levels | 4.1 | 87.33% |
| CL set at 20% par levels | 5.2 | 93.78% |
| CL set at 30% par levels | 5.8 | 98.00% |
| CL set at 40% par levels | 5.9 | 100.00% |

*FIG. 6A*

ADAPTIVE CRITICAL LOW LEVEL MANAGEMENT

STATEMENT AS TO RIGHTS TO INVENTIONS MADE UNDER FEDERALLY SPONSORED RESEARCH OR DEVELOPMENT

Not Applicable.

FIELD

The present disclosure generally relates to apparatus and methods for supply management and, in particular, relates to controlling the inventory of items in an institution, such as medical items in a health care institution.

BACKGROUND

It is well known in the medical community, and in particular, in hospitals, to use an inventory system for dispensing and administering medical items. In this system, medical items provided by a pharmacy, for example, are temporarily stored in a plurality of areas or stations for administration.

The inventory in these locations are commonly and carefully monitored. Monitoring information for each unique inventory commonly includes static levels of inventory below which or above which certain actions, such as an alert or refill, are triggered. These commonly monitored levels include a reorder level, a full level (also known as a par level), and a critical low level (also known as a safety stock level). The reorder level for an item is a value at or below which the item needs to be restocked. The critical low level is a value less than the reorder level but greater than zero (i.e., empty), and signals that the current use of the item is such that its stock may run out (i.e., hit zero) before the next scheduled restock. The critical low level is intended to prevent a stock out (i.e., running out of inventory) by signaling the need to restock inventory between scheduled restocks. Because it is difficult to account for the many variables that affect inventory usage, static critical low levels are often either set too low, resulting in stock outs, or too high, resulting in unnecessarily replenishing inventory.

Furthermore, it is difficult to manually select and/or adjust critical low levels for different types of items, especially in facilities with hundreds or thousands of item types. At such facilities, those with the requisite knowledge to manually select a preferred, subjective inventory level usually do not have the time to set such critical low levels for all the different items. Providing a preset critical low level value applicable to different types of items is also not beneficial, as different types of items are associated with different types of usage patterns. Further, usage patterns may vary over time, so that a pre-set critical low level that was correct at one time may not be appropriate at a later time.

SUMMARY

Embodiments of the adaptive critical low level management system ("management system") disclosed herein provide for inventory monitoring and notification of the need to order additional inventory using an "adaptive" critical low level, thereby reducing the number of medical item stock outs and replenishments required to keep a medical item in stock.

In certain embodiments, the management system continuously monitors usage of an inventory at a location and calculates an adaptive critical low level that reflects the probability of a stock out of that inventory according to its usage and according to a certain desired service level, e.g., the desired probability that demand can be met from current inventory. The calculation is based on the probability that an item will stock out between the current moment and the time of the next scheduled restock. The adaptive critical low level can be recalculated various times between scheduled restocks, taking into account the change in the length of the period remaining before the next scheduled restock.

According to one embodiment of the present disclosure, an adaptive critical low level management system includes a configuration module configured to receive a service level setting, and a storage module configured to receive usage information for at least one inventory of at least one type of medical item. The system also includes a processor configured to adaptively determine a critical low level based on said usage information and said service level setting, and an analysis module configured to determine when said critical low level has been reached by said at least one inventory of said at least one type of medical item, and to produce an output indication that said critical low level has been reached.

According to one aspect of the present disclosure, a method, for stock maintenance, includes selecting a service level setting, receiving usage information for at least one inventory of at least one type of medical item, and calculating a critical low level based on said usage information and said service level setting. The method further includes determining whether said critical low level has been reached by said at least one inventory of said at least one type of medical item, and outputting said determination.

According to another embodiment of the present disclosure, a computer-readable medium having computer-executable instructions for causing a processor to execute instructions to maintain a stock by performing steps includes selecting a service level setting, receiving usage information for at least one inventory of at least one type of medical item, and calculating a critical low level based on said usage information and said service level setting. The steps further include determining whether said critical low level has been reached by said at least one inventory of said at least one type of medical item, and outputting said determination.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the discussed embodiments as claimed.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is an illustration of a sample critical low calculation for a sequence of restocks that occurs every four days.

FIG. 5 illustrates a summary of the sample critical low calculation of FIG. 4.

FIGS. 6A and 6B illustrate a compilation of results from experiments that were conducted which varied service levels in accordance with one embodiment.

DETAILED DESCRIPTION

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail not to obscure the disclosure.

Figure 1:
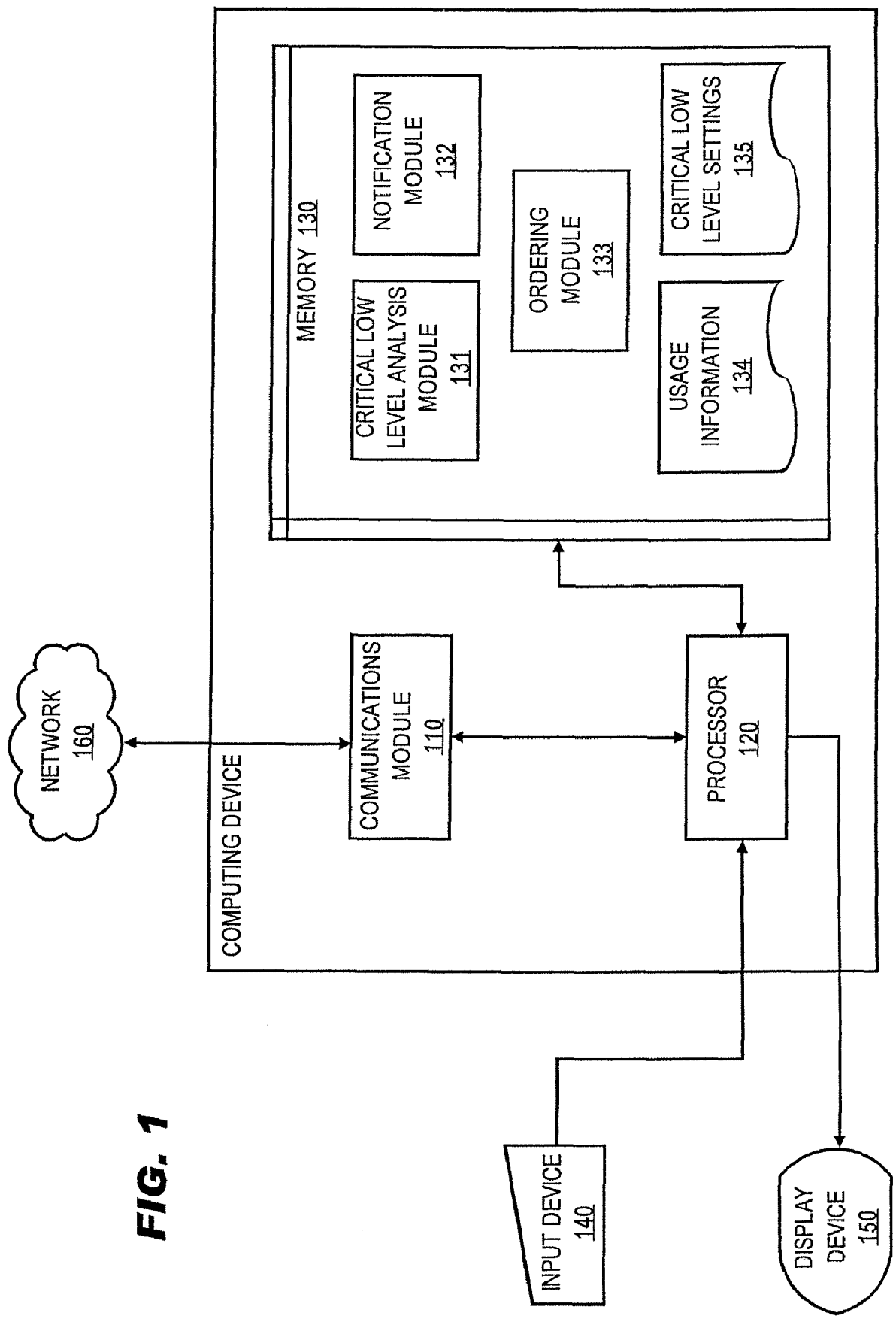
FIG. 1 illustrates one embodiment of a management system.

Referring now to the drawings, FIG. 1 illustrates one embodiment of a management system 100. The management system 100 includes memory 130, communications module 110, processor 120, input device 140, and display device 150. This configuration is exemplary only, such that other physical configurations may be employed.

The management system 100 is configured to monitor inventory of one or many items, and, based on the usage of the inventory, regularly determine an updated critical low level the inventory of each item using an input desired service level. The management system 100 can then transmit a notification if the calculated critical low level has been reached by the current level of the inventory for an item, and order additional inventory of that item if necessary. Consequently, by using a single, service level decision for a large number of different inventory items (instead of a single service level decision for each different inventory item), the management system is able to manage a number of inventory items using one service level setting. Automation may thus be used to recalculate critical low levels daily to minimize stockouts to a target service level and minimize labor associated with additional and/or unplanned replenishment activity.

The management system 100 features onboard memory 130. In the embodiment illustrated, memory 130 includes both software, such as critical low level analysis module 131, notification module 132, and ordering module 133, and data, such as usage information 134 and critical low level settings 135. Onboard memory 130 can be either non-volatile storage (e.g., read-only memory, flash memory, magnetic media, etc.), volatile storage (e.g., random-access memory), or both.

Figure 2:
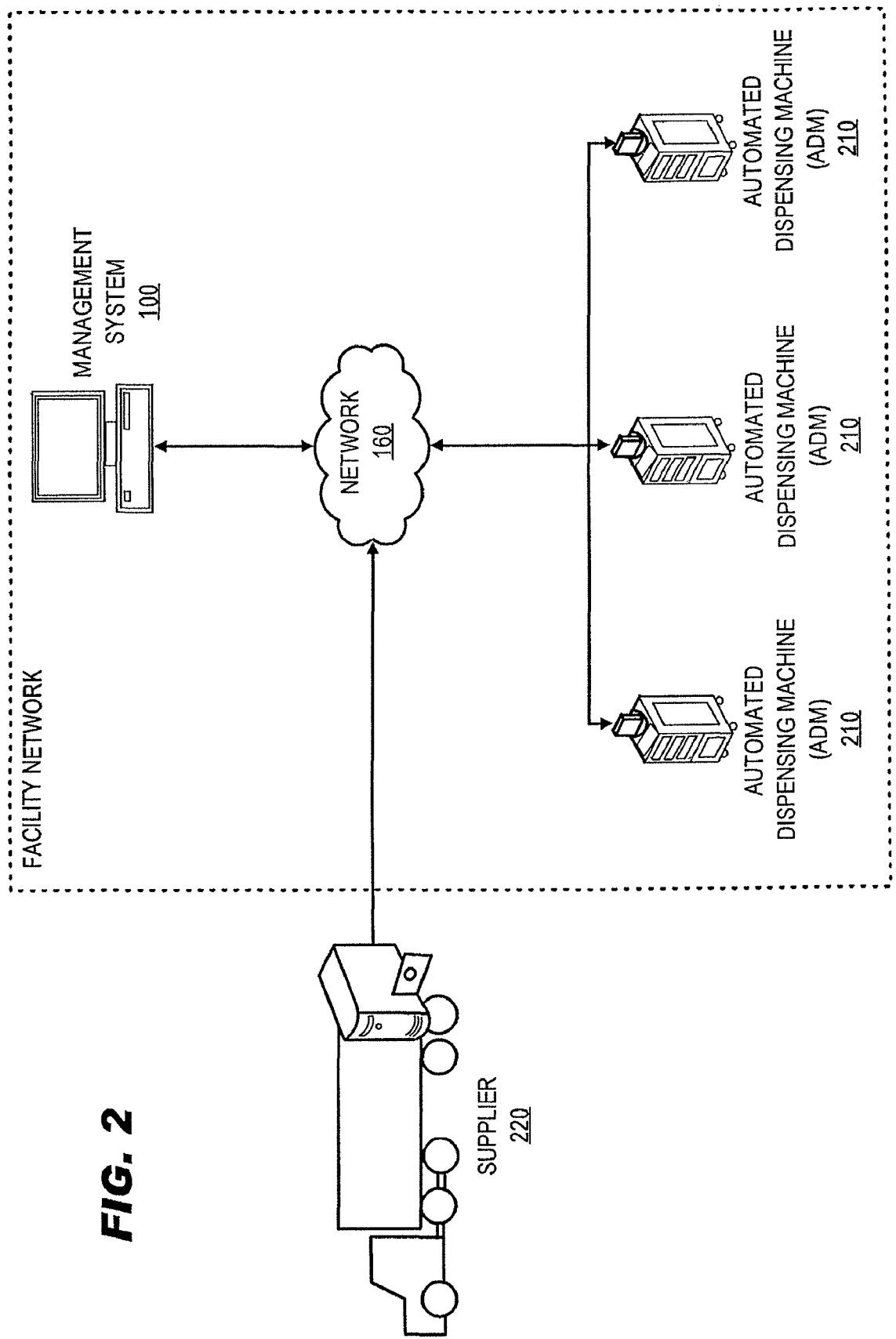
FIG. 2 is a block diagram of a network configuration for the management system of FIG. 1.

Usage information 134 contains information on the history of the items in inventory contained at different locations on network 160, such as at the various Automated Dispensing Machines ("ADM") 210 stations illustrated in FIG. 2. A block diagram of a network configuration for the management system of FIG. 1 is shown in FIG. 2. Usage information includes, for example, (1) number, type, and time of each change in inventory, (2) number, type and time of a previous inventory restocking, (3) the amount of time left before the next scheduled inventory restock, (4) whether inventory restocks are being performed on schedule, and (5) preset maximum number and minimum number for each type of inventory that can or should be stocked at any particular location.

Usage information 134 is received through communications module 110, which connects to network 160. Communications module 110 is configured to transmit, receive, and otherwise communicate information with network 160 and/or devices 210 on the network 160 representative of different stock locations. The management system 100 can be in continuous communication with network 160, or can connect to network 160 as necessary. Communication is achieved via a communication layer that enables data transmissions. Example communications modules 110 include serial communication interfaces such as RS-232, Ethernet, Universal Serial Bus ("USB"), and wireless interfaces such as radio frequency ("RF"), infrared, Bluetooth®, and IEEE 802.11x. For example, the management system 100 can be networked by connecting to a central data network device via data cables.

Critical low level analysis module 131 is configured to use processor 120 to determine and update a critical low level for any number of different items of inventory contained in any number of devices 210. Processor 120 represents, for example, a central processing unit ("CPU"), drives software stored in the computing device's memory 150 or elsewhere. The determined critical low level is stored in memory 130 as critical low level settings 135, and is calculated using both service level information (also stored as critical low level settings 135) and usage information 134 for the different items of inventory from the devices 210.

The desired service level is set by a management system user to reflect the desired probability that a demand (e.g., for an individual medical item or group of medical items) can be met from inventory and can be expressed in a number of ways, such as: the percentage of orders completely satisfied from inventory, the percentage of units demanded which are met from inventory, the percentage of units of inventory demanded which are delivered on time, the percentage of time there is inventory available, the percentage of stock cycles without shortages, and the percentage of item-months there is stock available. The service level may be input with input device 140, such as, but not limited to, a keyboard, a touchscreen display, a mouse, or a microphone.

Critical low level analysis module 131 determines an adaptive critical low level for items of inventory on the network 160 with reference to the preset service level setting and usage information 134. For example, the critical low level analysis module 131 can predict the probability of usage of an item based on prior usage information, e.g., the history of usage of the item. The critical low level analysis module 131 can calculate (1) average inventory usage of an item of inventory over n days, (2) total inventory usage over n days, (3) standard deviation of inventory usage over n days, where n equals a number of days, and (4) estimated inventory usage before the next scheduled restock. In certain embodiments, n ranges from one to three. In certain embodiments, n ranges from one to four. In certain other embodiments, n ranges from one to five. In further embodiments, n ranges from one to more than five.

In certain embodiments, the critical low level analysis module 131 continuously determines a critical low level based on a rolling statistical history of usage. In certain embodiments, the critical low level is set at the average inventory usage plus a number of standard deviations that approach a target service level in terms of inventory on hand. The statistical calculations are based on a rolling evaluation for windows of time representing the amount of time from the current day or moment to the next scheduled restock opportunity. As an example, if there are three days between scheduled restock opportunities, the management system 100 calculates the critical low level based on the average usage and deviation for rolling three day periods to reflect the amount of inventory expected to be consumed in the days remaining before the next scheduled restock opportunity with a probability equivalent to the service level target. As another example, if there are four days between scheduled restock opportunities, the management system 100 calculates the critical low level based on the average usage and deviation for rolling four day periods to reflect the amount of inventory expected to be consumed in the days remaining before the next scheduled restock opportunity with a probability equivalent to the service level target. Once the average and standard deviation of usage for the periods are known, the system calculates the inventory level representing the amount of usage for the period that represents the same probability of usage as the target service level. This calculation is achieved as documented in multiple inventory management text books for calculation reorder and safety stock levels, such as Richard Tersine, Principles of Inventory and Materials Management 204-272 (4th ed. 1993), incorporated in its entirety herein by reference. The critical low level analysis module 131 is thus configured to compare the current stock of an item against a calculated estimate of the usage of the item before its next scheduled restock opportunity in order to determine if a service level for the item will be met based on the likelihood of a stock out of the item occurring before the item's next scheduled restock opportunity.

Notification module 132 is configured to transmit a notification if the determined critical low level for a particular inventory item has been reached (e.g., if a stock out is expected to occur for the item before its next scheduled restock). In certain embodiments, notification module 132 is configured to transmit a notification alerting that the next scheduled restock date for a particular inventory will not be sufficient to maintain the desired service level. In certain embodiments, notification module 132 is configured to transmit a notification identifying the estimated date of next necessary restock in order to maintain the desired service level. Thus, a recipient of the notification can then decide whether or not to restock the inventory before the next scheduled restock in order to maintain the desired service level.

Notification module 132 is configured to transmit notifications using communications module 110. For example, notification module 132 is configured to provide remote notification by transmitting a notification directly to a device 210 on the network, thereby providing notification at the location 210 where the restock may be necessary. Notification module 132 can also provide local notification by transmitting a notification to display device 150, such as, but not limited to, visual indicators, such as indicator lights or display screens, including a cathode ray tube ("CRT") display, vacuum fluorescent display ("VFD"), light emitting diode ("LED") display, plasma display panel ("PDP"), liquid crystal display ("LCD"), organic light emitting diode ("OLED"), or surface-conduction electron-emitter display ("SED"), or audible indicators, such as speakers. Notification module 132 can further provide notification by transmitting or otherwise issuing a notification through other output devices, such as devices that produce hard copy documents (e.g., printers).

Optional ordering module 133 is configured to order additional inventory if the determined critical low level for a particular inventory item has been reached. Optional ordering module 133 can be configured to communicate with the appropriate supplier 220, illustrated in FIG. 2, to order the appropriate inventory.

Figure 3:
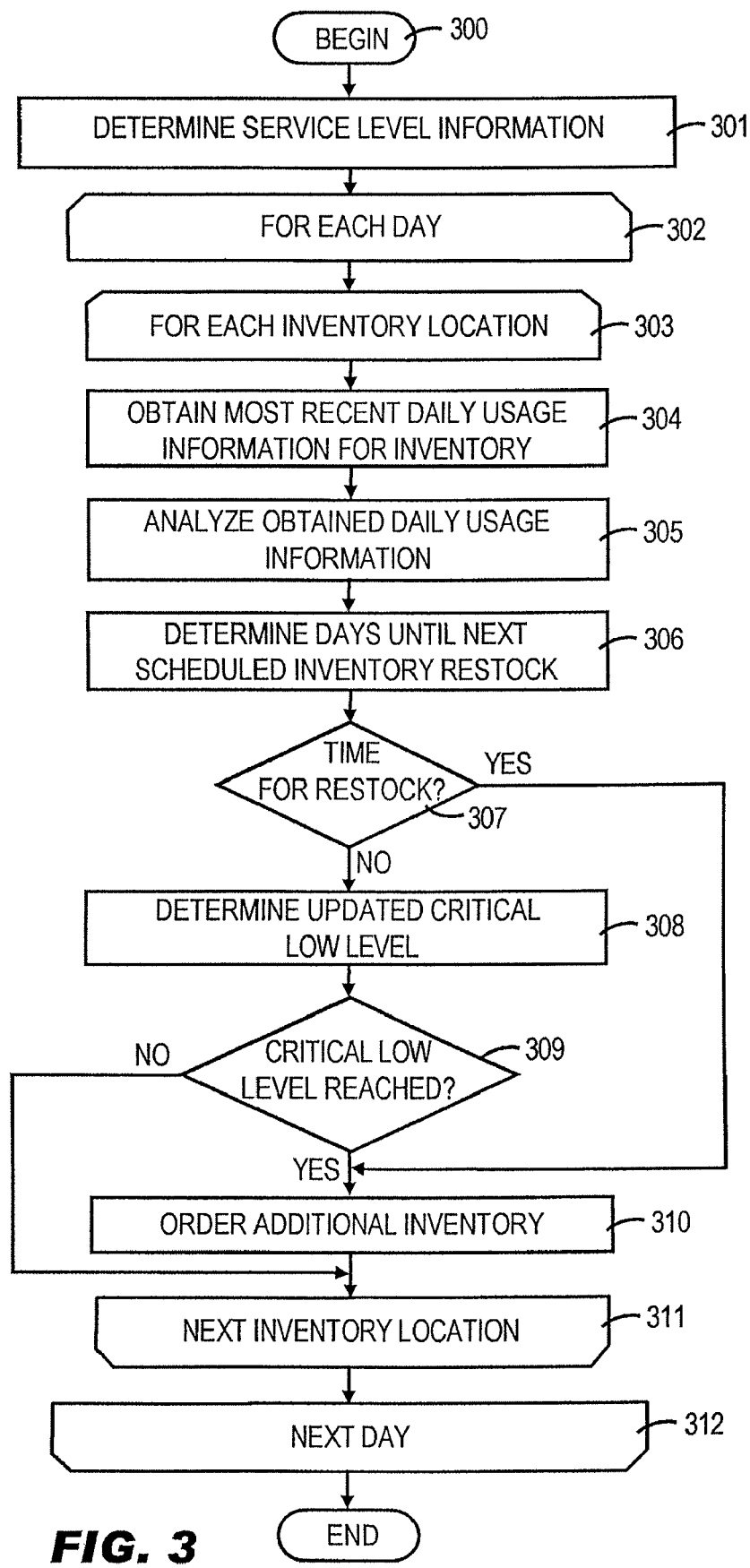
FIG. 3 is a flow diagram illustrating an exemplary process for adaptive critical low level stock management.

FIG. 3 is a flow diagram illustrating an exemplary process 300 for adaptive critical low level inventory management using the management system 100 of FIG. 1.

Process 300 begins by moving to state 301 wherein service level information is determined. For example, the service level information may be provided to the management system 100 using input device 140, as discussed above. Process 300 then begins a daily loop state 302 for each stock location 210 at nested loop state 303. Although the illustrated process 300 updates the critical level on a daily basis 302, in other embodiments, other periods of time may be used, such as, but not limited to, hourly updating, twice daily updating, and bi-weekly updating.

For each inventory location 303, such as ADM 210, the most recent daily usage information 134 is obtained in state 304. The daily usage information 134 is then analyzed in state 305 for relevant information, as described above, including (1) the number, type, and time of each change in inventory, (2) the number, type and time of a recent inventory restock, and (3) the preset maximum number and minimum number for each type of inventory that can or should be stocked at any particular location 210. Then, in state 306, the amount of time left before the next scheduled inventory restock is obtained. If it is time for a scheduled restock, as determined in step 307, then the process proceeds to state 310 in order to order additional inventory. If, however, it is not time for a scheduled restock, the process moves to state 309 in order to determine if a critical low level has been reached as described above based on the service level information determined in state 301, the amount of time left before the next scheduled inventory restock obtained in state 306, the current inventory level, and the daily usage information 134 obtained in step 304 and analyzed in state 305.

If in decision state 309 it is determined the critical low level has been reached for the inventory at the inventory location 210, then additional inventory is ordered in state 310. If, however, it is determined in decision state 309 that the critical low level has not been reached for the inventory at the inventory location 210, then process 300 moves to end loop state 311, and proceeds to repeat steps 304 to 310 for the next inventory location 210. After all inventory locations 210 are completed, process 300 moves to end loop state 312, and repeats steps 303 to 311 for the next day. After all days have been completed, process 300 ends.

FIG. 4 is an illustration of a sample critical low level calculation for a sequence of restocks that occurs every four days. The data further illustrates random usage of items in an inventory over a forty-five day period and the resulting impact on critical low levels, and on the restock activity of critical low levels in combination with a static reorder and par levels.

FIG. 5 illustrates a summary of the sample critical low calculation of FIG. 4. For example, the service level 501 used in FIG. 4 is illustrated in FIG. 5 as numbers of standard deviations (e.g. average+2σ represents approximately a 97.7% service level). The illustrated data assumes same day delivery of restock in order to harmonize the reorder level of FIG. 4.

Figure 6B:
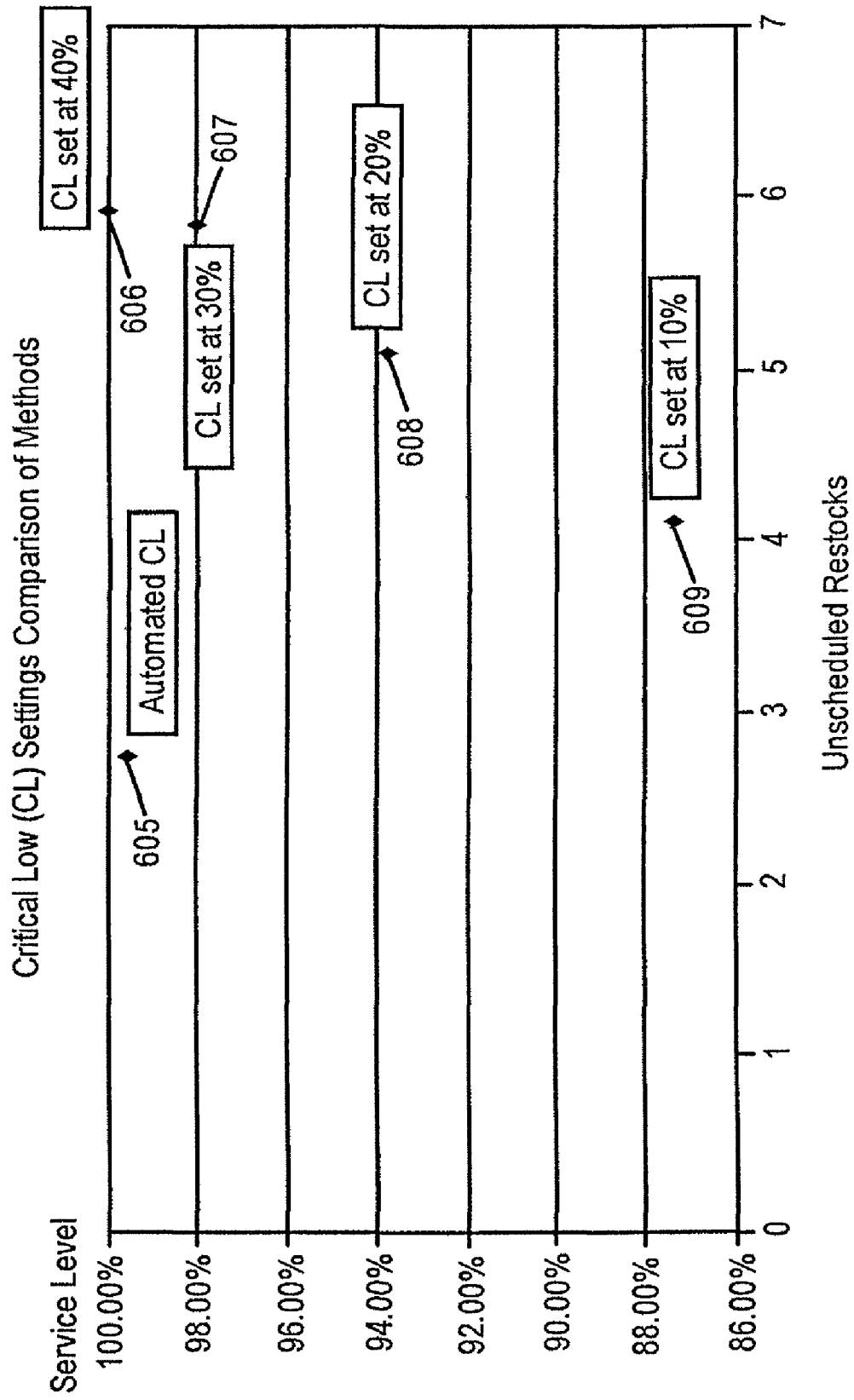

FIGS. 6A and 6B illustrate a compilation of results from experiments that were conducted which varied critical low levels in accordance with one embodiment. Specifically, FIGS. 6A and 6B illustrate the compilation of results from experiments varying critical low levels and monitoring the output of ten trials for one embodiment of the management system 100, each trial for a period of forty-five days, at five different critical low levels: a first critical low level automated at 2 sigma, a second critical low level of 10% of par levels (e.g., 1 item), a third critical low level of 20% of par levels (e.g., 2 items), a fourth critical low level of 30% of par levels (e.g., 3 items), and a fifth critical low level of 40% of par levels (e.g., 4 items). The unscheduled restocks 602 are also displayed in service level terms 603, as a number of additional restocks were required in order to explore the differences between the two approaches.

With reference to FIG. 6B, it is shown that critical low levels set at the highest rate (e.g., 40%) 606 achieved a 100% service level at the expense of an average of about 5.9 additional/unscheduled restocks per trial. Critical low levels set at the lowest rate (e.g., 10%) 609 achieved an 87% service level at the lesser expense of an average of about 4.1 additional restocks per trial. Automating critical low levels achieved a 99.8% service level 605 (i.e., 2.1% better than the target service level of 97.1%) with the lowest average number of additional restocks per trial, at about 2.6.

Certain observations may be made from these sample test results. For example, the automated critical low level can perform better than the target service level in the samples produced. For example, although the expected service level was 97.7%, the result of tests were 99%. This variance may have to do with the granularity of the inventory level. The service level could be closer if the maximum level were closer to 100% to allow more granularity in calculation. Additionally, there appears to be a trend of critical low levels, when set statically to increase the number of unscheduled restocks, being a trade off for service levels. Such a relationship supports the concept of high safety stocks to offset service level deficiencies. It may be expected that higher static critical low values will result in more additional restocks and continue to support a 100% service level. Furthermore, real world applications of static service level may not be as analytical as presented in this model. In general, applications specialists apply a rule-of-thumb metric on relative critical low size with no regard to usage patterns. It is important to look at the four static critical low settings in the model as possible selections, and not as analytically derived values for critical low levels. As such, the automated critical low level data appears to deliver a service level close to the target without burdening the replenishment activity for the item as much as static critical low level settings.

It should be appreciated from the foregoing description that while certain embodiments of the present disclosure are useful in the medical drug and supply field, other embodiments have applicability to a broad range of industries apart from the medical industry, where similar inventory control and security measures are preferred. The present disclosure is not intended to be limited to the medical supply and drug industry.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. An adaptive critical low level management system, comprising:
   a configuration module configured to receive a service level setting;
   a storage module configured to receive usage information for at least one inventory of at least one type of medical item;
   a processor configured to adaptively determine a critical low level based on said usage information and said service level setting; and
   an analysis module configured to determine when said critical low level has been reached by said at least one inventory of said at least one type of medical item, and to produce an output indication that said critical low level has been reached,
   wherein said processor is further configured to determine said critical low level based on a probability that said at least one type of medical item will stock out before a next scheduled time for restocking of said at least one type of medical item, and
   wherein said processor is further configured to determine said critical low level based on a sum of an average usage and at least one standard deviation for a restocking period of said at least one inventory of said at least one type of medical item.

2. The system of claim 1, further comprising a notification module configured to transmit a notification in response to said output indication from said analysis module when said critical low level has been reached.

3. The system of claim 2, further comprising a display module configured to display said notification.

4. The system of claim 1, further comprising an ordering module configured to order more inventory of said at least one type of medical item when said critical low level has been reached by said at least one inventory of said at least one type of medical item.

5. The system of claim 1, wherein said processor is further configured to determine said critical low level based on at least one of a total usage for said at least one inventory of said at least one type of medical item and an estimated inventory usage for said at least one inventory of said at least one type of medical item before a next scheduled restock of said at least one type of medical item.

6. The system of claim 1, wherein said usage information comprises at least one of a current number of said at least one inventory of said at least one type of medical item, an amount of time left before a next restock of said at least one inventory of said at least one type of medical item, and a preset maximum capacity or minimum capacity for said at least one inventory of said at least one type of medical item.

7. A method, for stock maintenance, comprising:
   selecting a service level setting;
   receiving usage information for at least one inventory of at least one type of medical item;
   calculating, with a processor, a critical low level based on said usage information and said service level setting;
   determining whether said critical low level has been reached by said at least one inventory of said at least one type of medical item; and
   outputting said determination,
   wherein said critical low level is further based on a probability that said at least one type of medical item will stock out before a next scheduled time for restocking of said at least one type of medical item, and
   wherein calculating the critical low level further comprises calculating a sum of an average usage and at least one standard deviation for a restocking period of said at least one inventory of said at least one type of medical item.

8. The method of claim 7, further comprising transmitting a notification when said critical low level has been reached by said inventory of said at least one type of medical item.

9. The method of claim 8, further comprising displaying said notification.

10. The method of claim 7, further comprising ordering additional inventory of said at least one type of medical item when said critical low level has been reached by said inventory of said at least one type of medical item.

11. The method of claim 7, wherein calculating a critical low level based on said usage information and said service level setting further comprises:
   calculating a total usage for said at least one inventory of said at least one type of medical item;
   calculating an estimated inventory usage for said at least one inventory of said at least one type of medical item before a next scheduled restock of said at least one type of medical item based on said service level setting; and calculating an estimated date of when said at least one inventory of said at least one type of medical item will stock out based on said calculated total usage and said calculated estimated inventory usage.

12. The method of claim 7, wherein said usage information comprises at least one of a current number of said at least one inventory of said at least one type of medical item, an amount of time left before a next restock of said at least one inventory of said at least one type of medical item, and a preset maximum capacity or minimum capacity for said at least one inventory of said at least one type of medical item.

13. A non-transitory computer-readable medium having computer-executable instructions for causing a processor to execute instructions to maintain a stock by performing steps comprising:

selecting a service level setting;

receiving usage information for at least one inventory of at least one type of medical item;

calculating a critical low level based on said usage information and said service level setting;

determining whether said critical low level has been reached by said at least one inventory of said at least one type of medical item; and outputting said determination, wherein said critical low level is further based on a probability that said at least one type of medical item will stock out before a next scheduled time for restocking of said at least one type of medical item, and wherein calculating the critical low level further comprises calculating a sum of an average usage and at least one standard deviation for a restocking period of said at least one inventory of said at least one type of medical item.

14. The computer-readable medium of claim 13, having further computer-executable instructions for performing said step of transmitting a notification when said critical low level has been reached by said inventory of said at least one type of medical item.

15. The computer-readable medium of claim 14, having further computer-executable instructions for performing said step of displaying said notification.

16. The computer-readable medium of claim 13, having further computer-executable instructions for performing said step of ordering additional inventory of said at least one type of medical item when said critical low level has been reached by said inventory of said at least one type of medical item.

* * * * *